April 23, 1940.  R. H. DUCEY  2,198,108
VEHICLE IDENTIFICATION AND SIGNALING DEVICE
Original Filed June 25, 1937  2 Sheets-Sheet 1

INVENTOR
Roger H. Ducey
BY
Everett E. Kent
ATTORNEY

April 23, 1940.    R. H. DUCEY    2,198,108
VEHICLE IDENTIFICATION AND SIGNALING DEVICE
Original Filed June 25, 1937    2 Sheets-Sheet 2

INVENTOR
Roger H. Ducey
BY
Everett E. Kent
ATTORNEY

Patented Apr. 23, 1940

2,198,108

UNITED STATES PATENT OFFICE 2,198,108

VEHICLE IDENTIFICATION AND SIGNALING DEVICE

Roger H. Ducey, Belmont, Mass.

Original application June 25, 1937, Serial No. 150,228. Divided and this application April 27, 1939, Serial No. 270,343

6 Claims. (Cl. 177—314)

This invention relates to improvements in vehicle identification and signaling devices.

More especially it provides improved license number plate units for vehicles wherein are safety features for detecting and announcing any unauthorized tampering with the license plates.

License plates as now provided and as now mounted on vehicles may be easily and quickly removed or interchanged by perpetrators of thefts of cars, or by others desirous of eluding the police. Also the present plates, when exposed to the elements, may become difficult to decipher, which is an important defect especially where a hit-and-run driver is speeding away from the scene of an accident.

It is among the objects of the invention to provide a license plate, and means for mounting it, such that the license number will be always clearcut and readily legible, and such that an attempt to remove the plate will result in an alarm being sounded and/or a short circuiting of the lighting system of the vehicle.

Other objects are to reduce materially the cost of providing license number plates; also to protect the less expensive plates of the invention against becoming soiled or otherwise deteriorating in use.

Still another object is to provide for the illumination of the license plate, to make its number and other data clearly visible at night.

It is, moreover, an important feature that my improved license plate and holder may be combined with a tail light, stop light, and backing light, or with directional signals, in a unit which may be conveniently compact and attractive, and which may be produced at a cost comparable to the costs of the license plate, light and fixtures as heretofore customarily provided.

For attaining the mentioned objects and results the invention may employ license plates made of opaque paper or other stock and having transparent or translucent numbers, name of state, year, etc. The plate may be protectively held behind glass in a housing, with one or more electric lamps behind the plate, for illuminating the license number, etc. A special distinguishing mark may be embodied in the paper stock of the plate for authentication purposes.

In conjunction with the housing of the license plate, I provide a device which automatically affects the electrical system of the car, whenever an attempt is made to remove the plate. This may be by closing a circuit to the horn, or by blowing a fuse in the lighting system, or both. But, in addition to the automatic safety features, the invention provides so that the license plate may be under lock and key, with the automatic features auxiliary, coming into play only in case access is gained to the plate.

A tail light, stop light and backing light, or arrow signals for indicating direction of turn, may be embodied in the license plate unit, to make a compact and attractive device for the rear of a vehicle. The plate features may be present in the front plate unit, in which case the tail light and signal lights will be omitted.

This application is a division of my application, Serial No. 150,228, filed June 25, 1937, now Patent No. 2,156,806, issued May 2, 1939.

It is intended that the patent shall cover, by suitable expression in the appended claims, whatever features of patentable novelty exist in the invention disclosed.

Figure 1:
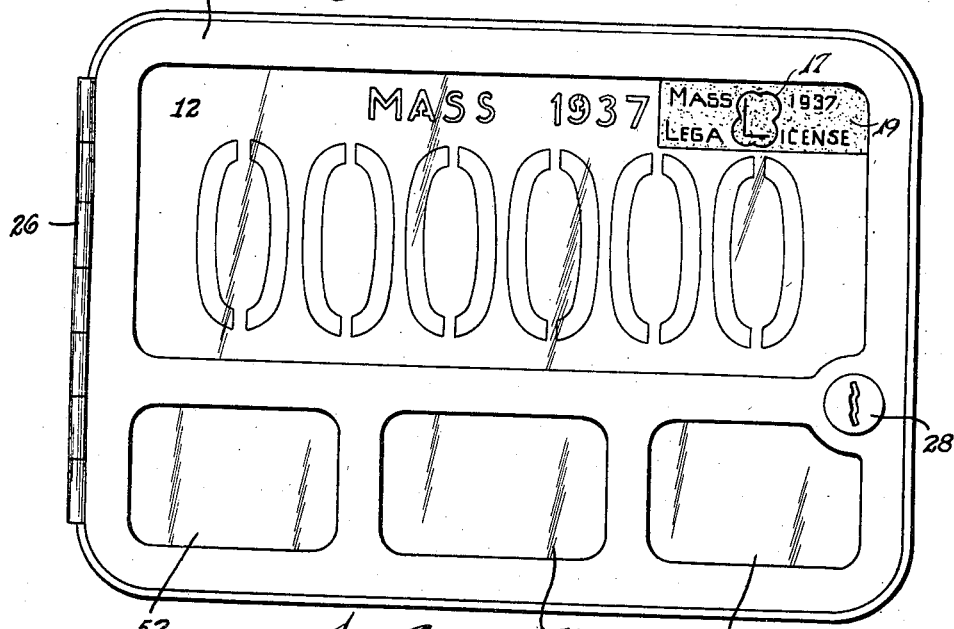
Figure 1 is an elevation of the front face of a license number unit embodying features of the invention.
Figure 2:
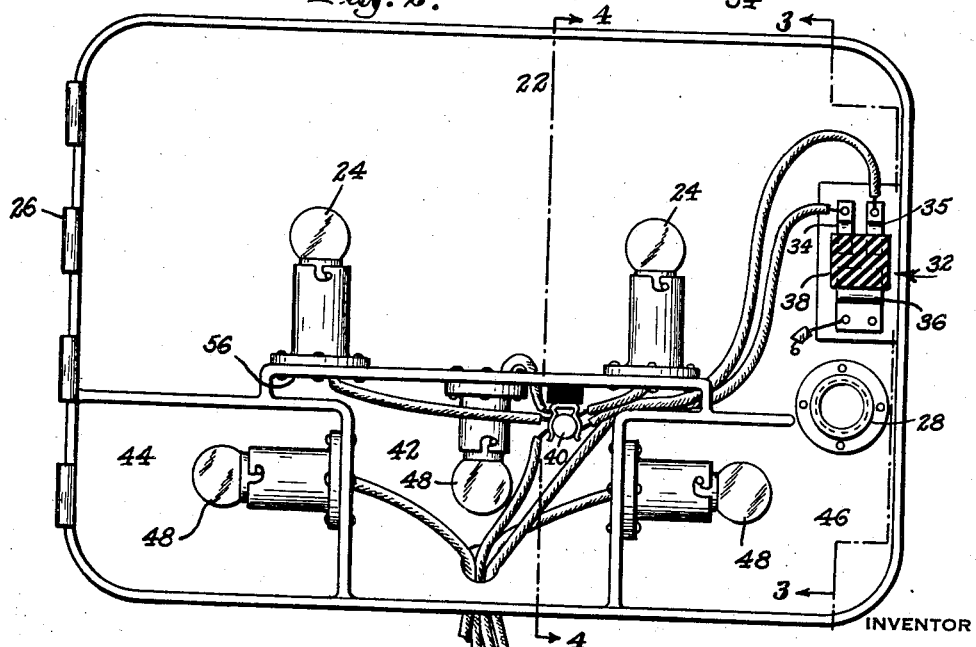
Figure 2 is a similar view with the front of the unit removed.
Figure 3:
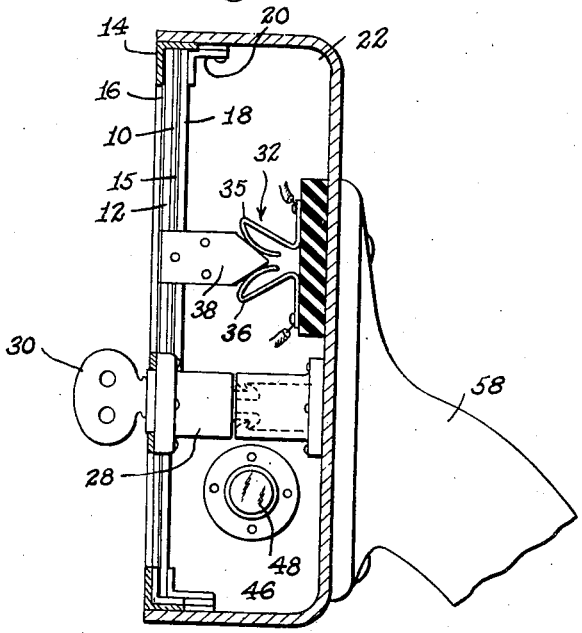
Figure 3 is an elevation in section on 3—3 of Figure 2.
Figure 4:
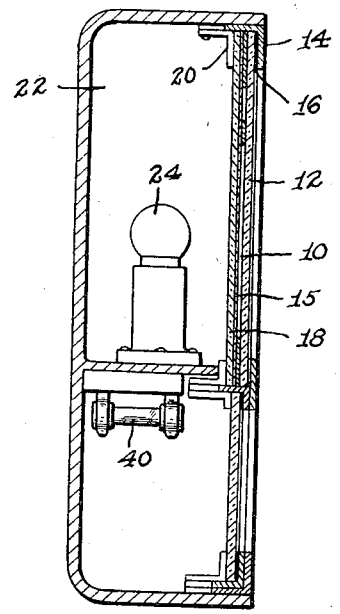
Figure 4 is an elevation in section on 4—4 of Figure 2.
Figure 5:
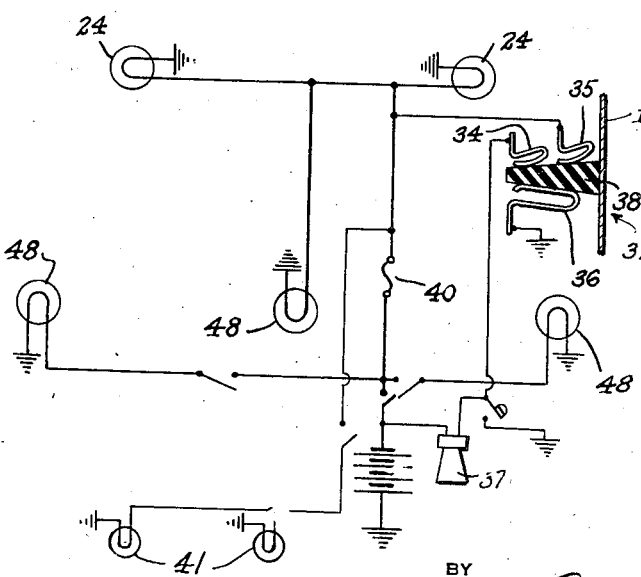
Figure 5 is a diagram showing the electrical connections.

Referring to the drawings, the license number plate 10, which may be of the regulation size, is mounted behind a glass plate 12 which, if desired, may be of the so-called non-shatterable variety. As represented, the glass plate 12 is secured in a marginal frame 14, being sealed, as by cement 16, against moisture, etc. The license plate 10 is removably mounted in frame 14, behind the glass, and may be backed by a second plate of glass 18 removably held against the license plate by suitable devices 20 which may be swung away or otherwise removed from engagement, in order to remove glass 18 and the license plate 10.

Figure 6:
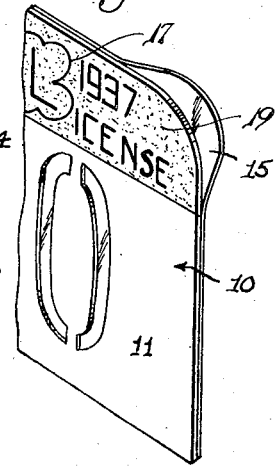
Figure 6 is a perspective of a fragment of the improved number plate per se.

According to the invention, the license plate 10 may safely be of an inexpensive material, such as paper, notwithstanding its perishable character. It is shown as made up of a relatively stiff sheet of paper 11 from the body of which the characters which tell the license number and incidental data are cut out; and a sheet of strong transparent, or in some cases translucent, paper 15 overlies the cut-out portions at the back side of the plate. The stiff paper 11 may be opaque or slightly translucent, and its front face may be enameled or otherwise treated to give it a desired color. Also, I prefer to embody in it an authenticating device, which may be a special watermark 17, to facilitate detection of spurious plates. If desirable or necessary a portion of the paper 11 may be free from enamel as suggested at the stippled areas 19 in Figures 1 and 6, to make the authenticating device readily visible.

The license plate 10 with its protecting glass constitutes the front wall of a housing 22, within which are mounted the electric lamps 24 which may be connected in the regular lighting system of the vehicle, so that the license plate is illuminated whenever the lighting system of the vehicle is operating.

The housing 22 may be of any suitable material, but I prefer to make it of stiff and strong metal, forming it to the desired shape, by casting, stamping or otherwise.

The marginal frame 14 likewise may be of cast or stamped metal and is portrayed as hinged at 26 at one end of the housing, so that it and its associated license plate and glass swing on the hinge between open and closed positions. The frame 14 is designed to fit snugly within the walls of housing 22 when closed, to minimize the possibility of dust and moisture entering the housing.

A lock 28 is provided for the hinged wall, preventing all persons from getting access to the interior of the housing and to the license plate except by means of a key 30 which may if desired be the ignition switch key of the vehicle.

The invention, however, provides additional safeguards against removal and interchange of license plates. A switch 32 is mounted within housing 22, comprising the spring contacts 34, 36 which tend normally to contact together to close a circuit to the horn 37 of the vehicle. When the hinged door of the unit is closed, an element 38 of insulating material holds contacts 34, 36 spread apart. But as soon as the door is opened, they spring together and the horn sounds an alarm. If desired, a fuse 40 may be introduced into the lighting system, with connection to contacts 35, 36, so that any closing of the contacts will blow the fuse and put out of operation all or any desired part of the lighting system of the vehicle, such as the headlights 41.

The described automatic safety features have utility only in connection with unauthorized tampering with a license plate unit. An authorized opening of the unit, such as for changing the license plate at the commencement of a new year, should be preceded by disconnection of a battery terminal. In the case of dealers, who change license plates frequently from day to day, the automatic safety features may be disconnected, and reliance for protection against theft of plates be placed entirely on the lock 28.

As illustrated in the drawings, the license plate features are combined in a unit with a tail light, stop light and backing light. These are arranged below the license plate, for which purpose housing 22 is larger than the plate. Interiorly, the housing has partitions dividing the lower portion of the housing into three chambers, each having an electric lamp 48 therein, of which the chamber 42 having red glass 50 may serve for the tail light, 44, having white glass 52 for the backing light and 46 having amber glass 54 for the stop light. These lights will be connected to the lighting system in the customary or any suitable way, for example, the tail light so as to be on whenever the headlights are on; stop light to be operated by the brake pedal; and the backing light to be lighted when the gear shift lever is moved into reverse position. The frame 14 may have provision for mounting the glass 50, 52 and 54, so that opening of the front of the unit gives access to the various lamps.

The tail light chamber 42 may open into the number plate chamber, as illustrated, and its lamp 48 may be mounted on the under side of a support 56 which may carry, on its upper side, the lamps 24.

Any desired type of mounting bracket 58 may be provided on the back wall of the unit, and the conductor wires may enter the unit through this bracket, or a separate flexible cable may house the conductors, preferably at the back of the unit.

I claim as my invention:

1. A license plate unit as in claim 3, in which the said electrical system includes vehicle headlights, and in which the said predetermined indication is an open condition of the electrical circuit to said headlights.

2. A license plate unit as in claim 3, in which the said electrical system includes an electric sound producing apparatus, and in which the said predetermined indication is a closed circuit for operating said apparatus.

3. A vehicle license plate unit adapted to be combined with a general service electrical system of a vehicle, comprising a housing including a hinged transparent front wall; a license plate mounted on the front wall of the housing and movable therewith; a lock for securing the front wall in normal position with the license plate enclosed in the housing; a switch connection in the electrical system within the housing, one element thereof being mounted on said hinged front wall, whereby a movement of the hinged wall actuates said switch; and means in said electrical system, and controlled by said switch, for giving a predetermined indication of a said movement of the hinged wall, to persons in the vicinity of the vehicle as well as persons in the vehicle.

4. A vehicle license plate unit adapted to be combined with a general service electrical system of a vehicle, comprising a housing and a license plate mounted therein, said housing having a wall through which the license plate is visible, and there being means whereby the plate may be withdrawn from the housing; a switch connection in the electrical circuit within the housing; and means in said electrical circuit, controlled by said switch, for giving a predetermined indication to persons in the vicinity of the vehicle as well as to persons in the vehicle; said plate and said switch being associated within the housing so that a movement of the plate incidental to a withdrawal of it from the housing is accompanied by an actuation of said switch producing the said predetermined indication.

5. In a vehicle license plate unit adapted to be combined with a general service electrical system of a vehicle, and having a housing, a license plate carried on a wall of the housing, said plate having areas of diverse ability for transmitting light through the plate, and having those areas combined in the plate to provide symbols for license data, the improvement of combining with the plate a lamp positioned for casting light through the plate and connected in said electrical system of the vehicle; means whereby the plate may be withdrawn from the housing; said electrical system including a source of electricity and an electric circuit containing an electrically controlled signaling device, and a switch in said circuit, within said housing, in the circuit, and between the source and said device, whose alternative make or break positions control the circuit to, and the signal of said device; there being means, responsive to removal of the plate from the housing, for actuating said switch; whereby the position of the plate relative to the switch is determinative of the state of said switch; said signal being indicative of a particular state, open or closed of the switch, and being a signal which manifests, to persons in the vicinity of the vehicle, that the license plate has been removed.

6. A license plate unit as in claim 5, in which the said device is a lamp in said circuit, and said signal is indicative of an open condition of said circuit, and, by the inoperative condition of said lamp circuit, manifests, to persons in the vicinity of the vehicle, that the license plate has been removed.

ROGER H. DUCEY.